(12) United States Patent
Finlay et al.

(10) Patent No.: US 7,680,821 B2
(45) Date of Patent: Mar. 16, 2010

(54) METHOD AND SYSTEM FOR INDEX SAMPLED TABLESCAN

(75) Inventors: Ian R. Finlay, Uxbridge (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 10/215,073

(22) Filed: Aug. 7, 2002

(65) Prior Publication Data
US 2003/0097354 A1    May 22, 2003

(30) Foreign Application Priority Data
Nov. 19, 2001   (CA)   ................................... 2363187

(51) Int. Cl.
*G06F 17/00*   (2006.01)
(52) U.S. Cl. .................... 707/104.1; 701/101; 701/102; 701/103 R; 701/202; 701/203; 701/204; 701/205
(58) Field of Classification Search ............... 707/1–10, 707/100–104.1, 200–206
See application file for complete search history.

(56) References Cited

U.S. PATENT DOCUMENTS

| | | | |
|---|---|---|---|
| 4,467,424 A | 8/1984 | Hedges et al. ................. 463/26 |
| 5,153,394 A | 10/1992 | Abendroth et al. ........ 200/61.52 |
| 5,618,232 A | 4/1997 | Martin .......................... 463/25 |
| 5,699,244 A | 12/1997 | Clark, Jr. et al. ............... 702/2 |
| 5,710,915 A | 1/1998 | McElhiney .................... 707/3 |
| 5,738,583 A | 4/1998 | Comas et al. .................. 463/40 |
| 5,768,382 A | 6/1998 | Schneier et al. ............... 380/51 |
| 5,800,268 A | 9/1998 | Molnick ....................... 463/40 |
| 5,802,357 A | 9/1998 | Li et al. ......................... 707/2 |
| 5,838,227 A | 11/1998 | Murray .................. 340/539.21 |
| 5,852,821 A | 12/1998 | Chen et al. ..................... 707/2 |
| 5,930,785 A * | 7/1999 | Lohman et al. ................. 707/2 |
| 5,938,721 A | 8/1999 | Dussell et al. .............. 701/211 |
| 5,970,143 A | 10/1999 | Schneier et al. ............. 713/181 |
| 5,999,808 A | 12/1999 | LaDue |
| 6,009,458 A | 12/1999 | Hawkins et al. ............. 709/203 |
| 6,016,476 A | 1/2000 | Maes et al. |
| 6,030,290 A | 2/2000 | Powell |
| 6,040,764 A | 3/2000 | Crisci .......................... 340/432 |
| 6,091,956 A | 7/2000 | Hollenberg .............. 455/456.3 |
| 6,104,815 A | 8/2000 | Alcorn et al. ................ 380/251 |
| 6,113,492 A | 9/2000 | Walker et al. |

(Continued)

OTHER PUBLICATIONS

"IBM and Symbol Technologies Partner to Provide Wireless Network Casino Solution" (http://www.symbol.com/news/pressreleases/press_releases_wirelesslans_8.html, dated Sep. 23, 1998).

(Continued)

*Primary Examiner*—Isaac M Woo
(74) *Attorney, Agent, or Firm*—Sawyer Law Group P.C.

(57) ABSTRACT

An optimized query processing system and method for a database system. The database system includes a table of data and an index correlated to both the query and to the table. The optimized query processing system includes an index accessing module adapted to access the index to determine if the table contains an entry satisfying a query predicate; and a tablescan module for scanning substantially the entire table and retrieving data satisfying the query. A method is also disclosed for generating database diagnostic data.

16 Claims, 3 Drawing Sheets

U.S. PATENT DOCUMENTS

| | | | | |
|---|---|---|---|---|
| 6,145,083 | A | 11/2000 | Shaffer et al. | 713/201 |
| 6,178,510 | B1 | 1/2001 | O'Connor et al. | 713/201 |
| 6,233,464 | B1 | 5/2001 | Chmaytelli | 455/556.2 |
| 6,249,744 | B1 | 6/2001 | Morita | 701/213 |
| 6,353,412 | B1 | 3/2002 | Soliman | |
| 6,364,550 | B1 | 4/2002 | Petteruti | 400/88 |
| 6,374,179 | B1 | 4/2002 | Smith et al. | 701/201 |
| 6,377,810 | B1 | 4/2002 | Geiger et al. | 455/456.2 |
| 6,389,291 | B1 | 5/2002 | Pande et al. | 455/456.2 |
| 6,397,074 | B1 | 5/2002 | Pihl et al. | 455/456.2 |
| 6,556,990 | B1 * | 4/2003 | Lane | 707/6 |
| 6,621,941 | B1 * | 9/2003 | Syeda-Mahmood et al. | 707/3 |
| 6,795,817 | B2 * | 9/2004 | Agarwal et al. | 707/2 |

OTHER PUBLICATIONS

"Smaller and Smaller: The Evolution of the GPS Receiver", by Richard B. Langley, *GPS World Online*, Apr. 2001.

"Bluetooth™ Chip Set Solution from Texas Instruments", Texas Instruments *Product Bulletin*.

"Bluetooth Solutions: Overview", Texas Instruments, http: //focus.ti.com/docs/apps/catalog/overview/overview.jhtml.

"gpsOne enhanced by SnapTrack™, Position Location Solutions for cdmaOne™ and 1x", Qualcomm Incorporated CDMA Technologies, http://www.cdmatech.com.

"Security Comparison: Bluetooth™ Communications vs. 802.11", by Thomas G. Xydis Ph.D., Simon Blake-Wilson, Bluetooth Security Experts Group, Nov. 10, 2001, revised Feb. 1, 2002.

"Primer on Smart Cards", by Charles Cagliostro, http://www.scia.org/knowledgebase/aboutSmartCards/primer.htm.

"BioLink U-Match Mouse", BioLink, http://www.biolinkusa.com/products.

"GPS Moves Indoors", by Jay Wrolstad, NewsFactor Network, Jul. 2, 2002, http://sci.newsfactor.com/perl/story/18471.html.

"MSM3300™ Chipset Solution", Qualcomm CDMA Technologies—Integrated Solutions, http://www.cdmatech.com/solutions/products/shipset_msm3300.html.

"MSM3300™ Mobile Station Modem", Qualcomm CDMA Technologies—Integrated Solutions, http://www.cdmatech.com/solutions/products/msm3300.html.

"RFT3100™ Transmit Chip", Qualcomm CDMA Technologies—Integrated Solutions, http://www.cdmatech.com/solutions/products/rft3100.html.

"RFR3300™ Receive Chip", Qualcomm CDMA Technologies—Integrated Solutions, http://www.cdmatech.com/solutions/products/rfr3300.html.

"IFR3300™ Rx IF-to-Baseband Processor", Qualcomm CDMA Technologies—Integrated Solutions, http://www.cdmatech.com/solutions/products/ifr3300.html.

"PM1000™", Qualcomm CDMA Technologies—Integrated Solutions http://www.cdmatech.com/solutions/products/pm1000.html.

"Wireless Internet Launchpad™", Qualcomm CDMA Technologies—Integrated Solutions, http://www.cdmatech.com/solutions/products/wirelesslaunchpad.html.

"Press Room—QUALCOMM CDMA Technologies Announces New Multimedia MSM3300 CDMA Single-Chip Modem Solution", Qualcomm CDMA Technologies, http://www.qualcomm.com/press/pr/releases2000/press333.html.

"Press Room—QUALCOMM CDMA Technologies Delivers World's First CDMA Multimedia Chipset and System Software Solution for Handsets", Qualcomm CDMA Technologies, http://www.qualcomm.com/press/pr/releases2000/press230.html.

"QUALCOMM's gpsOne Technology Supports First Nationwide Launch of GPS Solutions on Wireless Handsets by KTF in South Korea", Qualcomm CDMA Technologies, http://www.umtschips.com/press/releases/2002/020212ktf.html.

* cited by examiner

METHOD AND SYSTEM FOR INDEX SAMPLED TABLESCAN

FIELD OF THE INVENTION

The present invention relates to the field of database management systems generally, and in particular, to optimization techniques for processing queries in structured query language (SQL) database engines.

BACKGROUND OF THE INVENTION

In the world of SQL database engines, improving the efficiency of processing SQL queries can be of substantial importance, particularly for large systems processing many thousands of queries a day. For greater clarity, while the term "query" is used throughout this document, it should be understood that this term is also intended to refer to any type of SQL statement, including statements that insert, delete or modify data, based on qualifying criteria. As will be understood by one skilled in the art, such statements are commonly referred to as "SQL statements" or DML (data manipulation language).

Typically most database applications having large tables of data also have corresponding indexes which can be searched in order to locate specific data in the tables. While the database application may search through the index to determine the locations of data in the table satisfying the query and retrieve the indexed data from the table, in certain cases (typically in which the type of data sought has a low distinct cardinality resulting in the retrieval of a significant portion of the table), this approach may be inefficient.

Alternatively, in cases in which a significant portion of the table might have to be retrieved in order to answer a query, the database application may be configured to scan through the entire table to retrieve the data in order to satisfy the query. However, this approach may also prove inefficient, particularly in the event that the table does not contain any data satisfying the query (in which case a negative response is returned).

Accordingly, the applicants have recognized a need for a system and methodology for more efficiently processing certain types of database queries.

The present invention addresses such a need.

SUMMARY OF THE INVENTION

The present invention is directed towards an optimizer for processing a query to a database system. The database system includes a table of data and an index correlated to both the query and to the table.

The subject optimized query processing system includes an index accessing module adapted to access the index to determine if the table contains an entry satisfying a query predicate; and a tablescan module for scanning substantially the entire table and retrieving data satisfying the query.

The subject invention is also directed towards a program product stored on a computer readable medium. The program product includes an optimized query processing system for processing a query to a database system, wherein the database system comprises a table of data and an index correlated to both the query and to the table. The optimized query processing system in turn includes an index accessing module adapted to access the index a specified number of times to determine if the table contains an entry satisfying the query; and a tablescan module for scanning substantially the entire table and retrieving data satisfying the query.

The present invention is further directed towards a method of processing a database query, wherein the database comprises a table of data and wherein the database also comprises an index correlated to both the query and to the table, the method comprising the following steps:
1. receiving the database query;
2. accessing the index to determine if the table contains an instance satisfying a query predicate; and
3. if step B determines that the table contains an instance of data satisfying the query predicate, scanning the table to retrieve all instances of data satisfying the query.

DETAILED DESCRIPTION

The present invention relates to the field of database management systems generally, and in particular, to optimization techniques for processing queries in structured query language (SQL) database engines. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
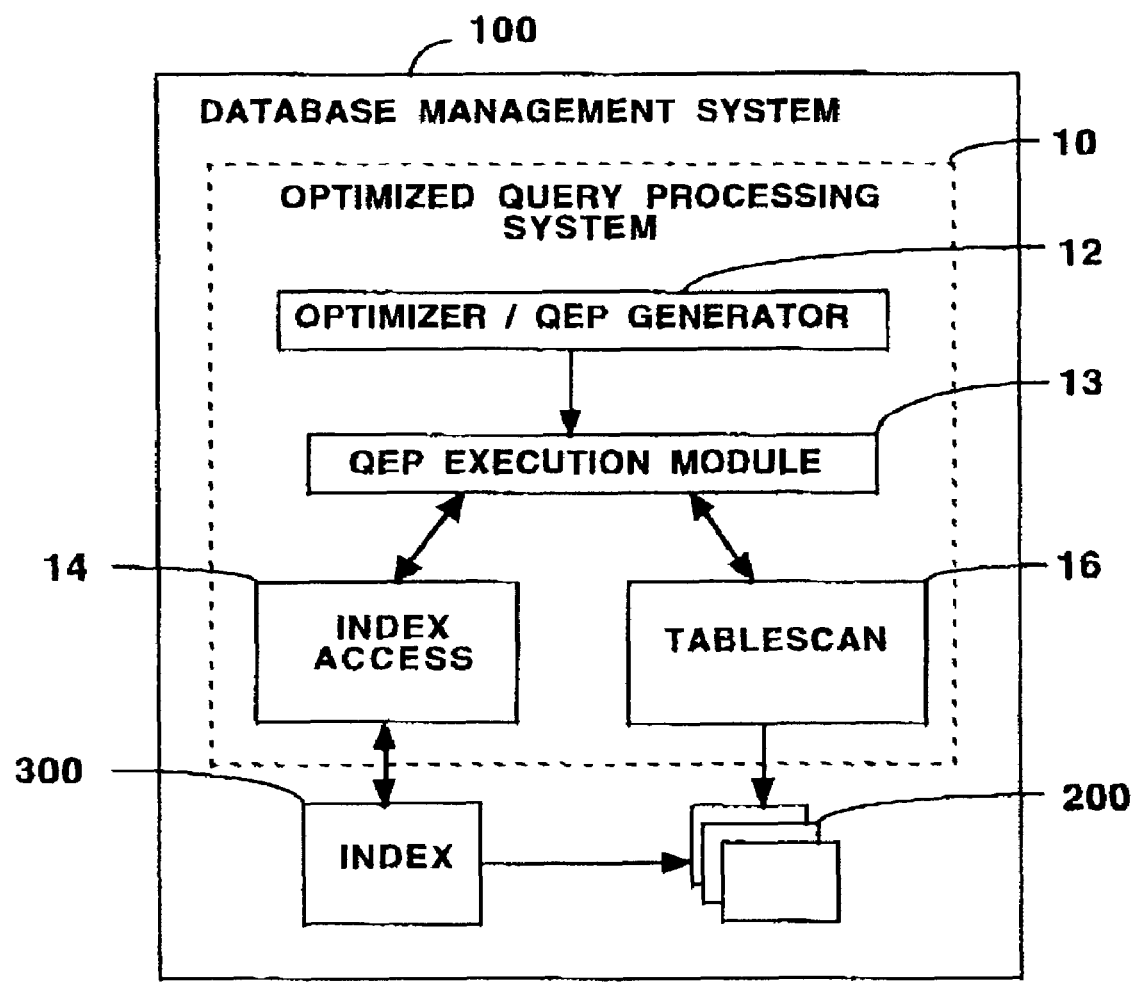
FIG. 1 is a schematic diagram of a database system having an optimized query processing system made in accordance with the present invention.

Referring to FIG. 1, illustrated therein is a preferred embodiment of the optimized query processing system of the subject invention. The system, shown generally as 10, comprises an optimizer module 12, a QEP execution module 13, an index access module 14 and a tablescan module 16. The optimized query processing system 10 preferably forms part of a database management system, shown generally as 100 which includes a database (or table) 200 of data and a corresponding index 300 to the data. In general, the optimized query processing system 10 and database system 100 comprise software and data implemented on a hardware infrastructure.

As will be understood, the database management system 100 is configured to receive database queries (typically in the form of SQL) and return data in response to each query.

Figure 2:
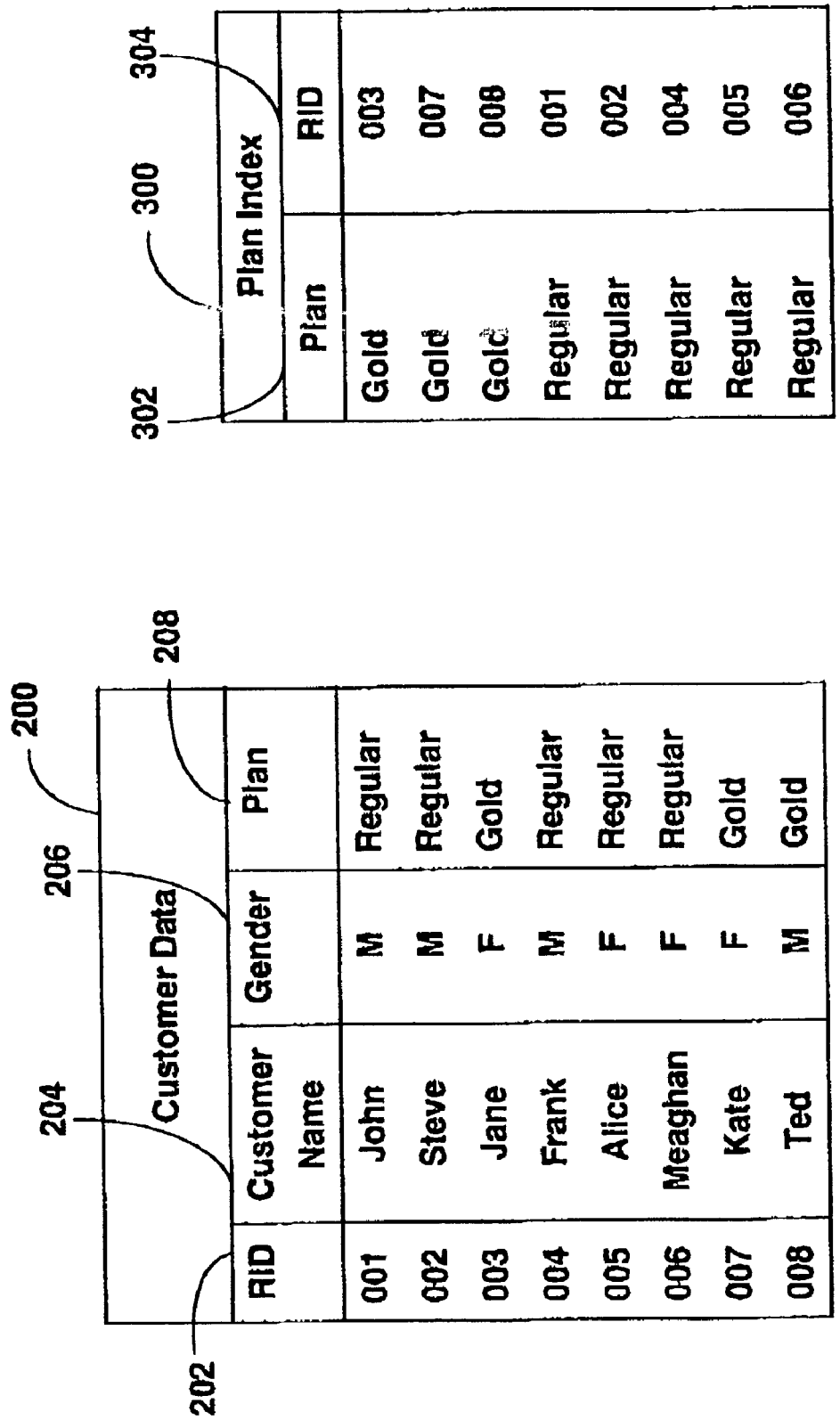
FIG. 2 a table of data and two corresponding indexes.

For illustrative purposes, FIG. 2 shows a table 200 of customer data, and a corresponding customer plan index 300 which might be contained in a database. It should be understood that a table may have a plurality of related indexes.

The customer data table 200 contains four columns of data, including a column of row identifier (RID) data 202, a column of customer name data 204, a column of customer gender data 206 and a column of customer plan data 208. Each row contains data corresponding to a particular customer and is uniquely identified by its RID data 202. As will be understood, while the table 200 has been illustrated as having four columns of data, database tables often comprise many columns of data and can be hundreds of thousands of pages of data in length.

The corresponding customer plan index 300 contains two columns of data, including a column of customer plan data 302 and a column of RID data 304. As will be understood, the plan data 302 is typically grouped and contains a row entry corresponding to each row of data in the customer data table 200. Each row in the index 300 contains RID data 304 matching the corresponding RID data 202 in the table 200. The sample RID data 202, 304 illustrated in FIG. 2 are simple decimal numbers. However, since tables comprise hundreds or thousands of pages of data, typically the RID data 202, 304 will comprise both page and row data, or other data to uniquely identify each row of data in the table 200.

It will typically be understood that a "correlated index" refers to the combination of a table and an index. The data entries in such an index are ordered (within their respective groups) to parallel those of the table—in general, the RIDs for each group in the index are in order, effectively allowing for continuous reading of the table from beginning to end. However, for greater clarity, references herein to a "correlated index" and "an index correlated to a table" (and variations thereof) are not intended to be limited to a "correlated index" as typically understood and defined at the beginning of this paragraph. Such references are merely intended to indicate a corresponding relationship between the index and the table.

In general, there may be numerous techniques for locating and retrieving the data requested by the query from the database 200. However, these different methods for obtaining the data are not uniformly efficient with respect to their use of resources (eg. processing time, memory, I/O (input/output) accesses). Accordingly, the function of the optimizer module 12 is to determine an acceptably efficient method for retrieving the requested data, and generating a corresponding query execution plan (QEP). The QEP will typically be in the form of binary-encoded instructions (executed by the QEP execution module 13) for implementing a sequence of operations to resolve the SQL query.

The optimizer module 12 determines an optimal QEP for answering a query through reference to defined optimization rules. Specifically the optimizer module 12 is preferably programmed to detect certain characteristics of the query, and correspondingly determine if the index sampled tablescan method of the present invention should be implemented. Such characteristics may include whether the data required in the search predicate is located (if it exists) in a column 204, 206, 208 having a low distinct cardinality—ie. if there are only a few different values for the data in the column 204, 206, 208. For example, the customer gender column 206 and the customer plan column 208 may be considered to have a low distinct cardinality since both columns 206, 208 only contain two different values (male and female, and regular and gold, respectively).

Even if the data would not be located in a low cardinality column, the optimizer module 12 may also be programmed to recognize that the specific data for the search predicate is extremely common. For example, while a database of athletic club memberships may indicate that there are many different nationalities represented by the memberships, one nationality is predominant. If the predicate of the query matches the predominant data, the optimizer module 12 may be programmed to implement the search method of the present invention.

Additionally, if the query includes a predicate containing a parameter marker or host variable (effectively a "wild card", the value of which will be provided at a later time, as will be understood), the optimizer module 12 may be unable to determine the number of rows that will qualify the predicate, particularly when the data has a high degree of skew (many rows have a single value). The missing "wild card" data is typically provided once the QEP execution module 13 receives the QEP. In such a case, combined with the conditions noted above, the optimizer module 12 may be programmed to implement the search method of the present invention.

For greater clarity, it should be understood that while the term "optimal" is used herein in reference to the QEP generated by the optimizer module 12, "optimal" is not intended to indicate that the generated QEP is the "best" in an objective sense.

The optimizer module 12 is operatively coupled to the QEP execution module 13, which in turn is operatively coupled to both the index access module 14 and the tablescan module 16. The index access module 14 is adapted to access the index 300 once, in order to determine if the index 300 (and hence the table 200) contains a single data entry satisfying the query predicate. If such a data entry is located, the tablescan module 16 is activated to scan through each row in the table 200 to locate all data in the table satisfying the query. If the index access module 14 determines that the index 300 does not contain an entry satisfying the query, then the database system 100 generates an empty response. For greater clarity, while the index access module 14 is identified herein as accessing the index 300 "once" or a "single time", it should be understood that multiple data accesses may be required in order to determine if a data entry satisfying the query is contained in the index 300.

As will be understood by one skilled in the art, by first accessing the index 300 if no query satisfying data is located, a null response may be returned more efficiently than if the table 200 was scanned. Correspondingly, if the table 200 contains a large number of entries satisfying the query, accessing the index 300 a single time to determine that a entry exists and then scanning the table 200 to locate all qualifying data, may be more efficient than searching the index 300 to locate the RID and access the appropriate page and row of the table 200 for each qualifying entry in the table 200.

By way of illustration, the following is a sample query Q1 designed to locate the names of customers having a "Regular" plan registration:

Q1: SELECT CUSTOMER_NAME FROM CUSTOMERS WHERE CUSTOMER_PLAN="Regular";

Upon the database system 100 receiving such a query, the optimizer module 12 determines that the data required is located (if it exists) in the customer plan column 208 having a low distinct cardinality. The optimizer module 12 then generates a QEP causing the index access module 14 to access the index 300, in order to determine if the index contains a "Regular" customer plan entry 302. Since the index 300 contains such an entry, the QEP (executed by the QEP execution module 13) causes the tablescan module 16 to scan through each row in the table 200 to locate the customer names of all the "Regular" plan customers, and causes the database system 100 to return the retrieved data.

Similarly, by way of illustration, the following is a sample query Q2 designed to locate the names of customers having a "Platinum" plan registration:

Q2: SELECT CUSTOMER_NAME FROM CUSTOMERS WHERE CUSTOMER_PLAN="Platinum";

Upon the database system 100 receiving such a query, the optimizer module 12 determines that the data required is located (if it exists) in the customer plan column 208 having a low distinct cardinality. The optimizer module 12 then generates a QEP causing the index access module 14 to access the index 300, in order to determine if the index contains a "Platinum" customer plan entry 302. Since the index 300 does not contain such an entry, the QEP causes the database system 100 to return a null response.

As one skilled in the art will understand, when a parameter marker is included in a search query, with such an unknown, the most efficient method of retrieving the requested data is not clear and thus sampling the index 300 prior to performing a tablescan, in accordance with the present invention, is appropriate.

Figure 3:
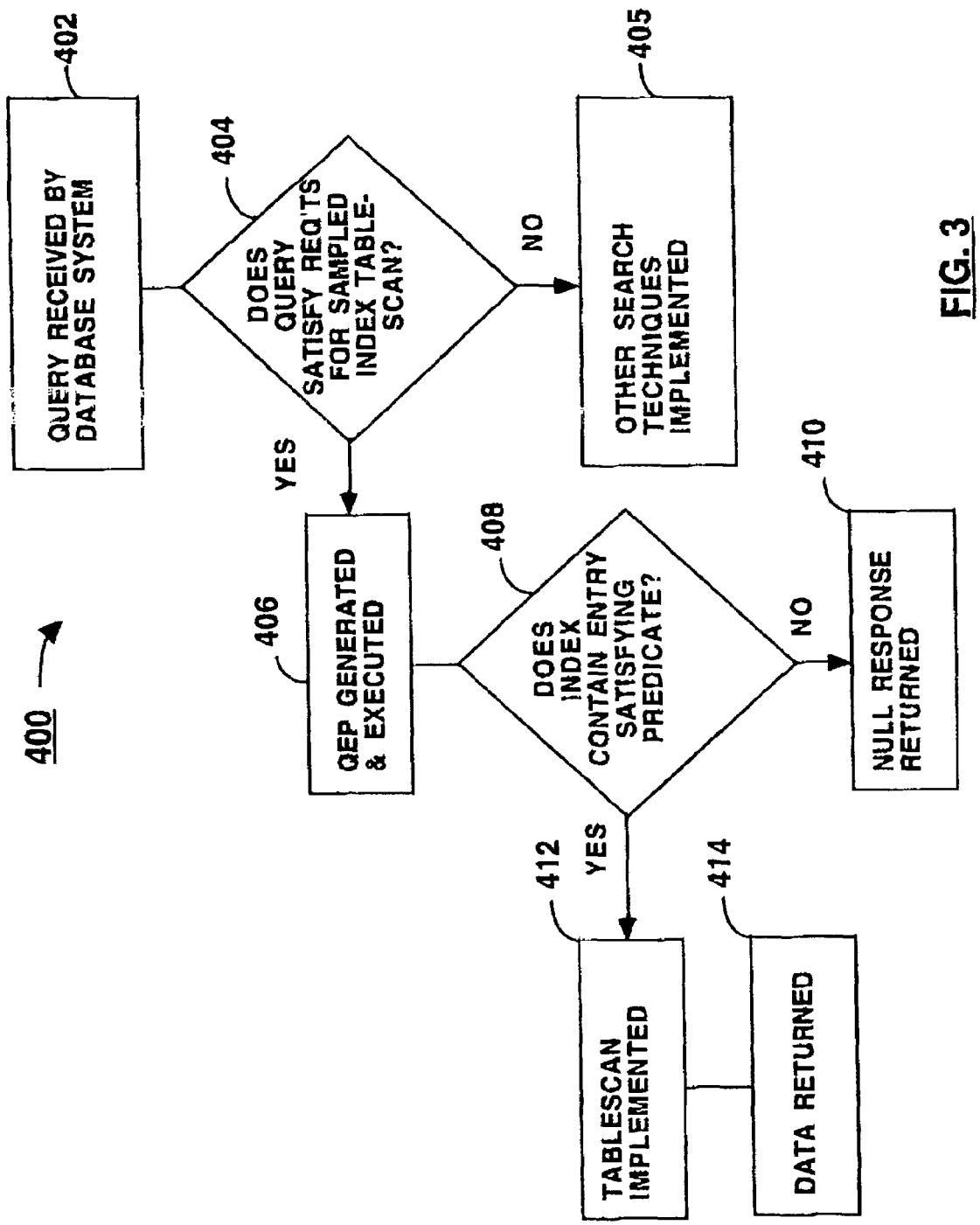
FIG. 3 is a flow chart showing a method of processing a database query of the present invention.

FIG. 3 illustrates the steps of the method 400 to generate database diagnostic data carried out by the database system 100 and the optimized query processing system 10 made in accordance with the subject invention.

The database 100 first receives a database query, for example, as a result of a customer requesting a discount for a purchase under a customer incentive plan. (Block 402) Upon receipt of the query, the optimizer module 12 determines whether the query satisfies predefined rules for implementing an index sampled tablescan of the present invention. (Block 404) If the query does not satisfy the rules for implementing an index sampled tablescan of the present invention, then other query search techniques are used to satisfy the query. (Block 405)

If the query satisfies the rules for implementing an index sampled tablescan, the optimizer module 12 then generates a QEP which is executed by the QEP execution module 13. (Block 406) The QEP causes the index access module 14 to access the index 300, in order to determine if the index contains an entry satisfying the query predicate (Block 408). If no such entry is located, a null response is returned by the database system 100 (Block 410).

If a satisfactory entry is located in the index, the QEP causes the tablescan module 16 to perform a tablescan to scan through each row in the table 200 to locate the data sought by the query (Block 412), and causes the database system 100 to return the retrieved data (Block 414).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An optimized query processing system in a database system in a computer system, the optimized query processing system for processing a query to the database system, wherein the database system comprises a table of data and an index correlated to both the query and to the table, the optimized query processing system comprising:

an optimizer module to receive a query, the optimizer module to determine whether data responsive to the query has low distinct cardinality;

an index accessing module, coupled in communication with the optimizer module, responsive to the optimizer module determining that the data responsive to the query has low distinct cardinality, the index accessing module to access the index to determine if the table contains a first data entry satisfying the query; and a tablescan module, coupled in communication with the index accessing module, responsive to the index accessing module determining that the first entry satisfies the query and prior to determining that a second data entry satisfies the query, the tablescan module to scan substantially the entire table to retrieve substantially all data values satisfying the query.

2. The optimized query processing system as claimed in claim 1, further comprising a query execution plan generation module adapted to generate a query execution plan to cause the index accessing module to access the index to determine if the table contains an entry satisfying the query.

3. The optimized query processing system as claimed in claim 2, wherein the query execution plan generation module is further adapted such that the query execution plan causes the tablescan module to scan substantially the entire table and retrieve data satisfying the query if the index accessing module determines that the table contains an entry satisfying the query.

4. The optimized query processing system as claimed in claim 1, further comprising an optimizer module for detecting predetermined characteristics for a query received by the database system.

5. The system of claim 1, wherein the optimizer module, responsive to determining that the data responsive to the query does not have low distinct cardianality, to determine whether the data responsive to the query has at least one value with high frequency, and the index accessing module, responsive to the optimizer module determining that the data responsive to the query has at least one value with high frequency, to access the index to determine if the table contains a first entry satisfying the query.

6. The system of claim 1, wherein the optimizer module, to determine whether the query includes a wild card, and the index accessing module, responsive to the optimizer module determining that the query includes a wild card, to access the index to determine if the table contains a first entry satisfying the query.

7. The system of claim 1, wherein the index accessing module, responsive to the optimizer module determining that the data query does not have low distinct cardinality, the index accessing module to access the index to determine row identification for the table corresponding to each entry satisfying the query, and the tablescan module to retrieve values corresponding to the row identifications.

8. A computer implemented method of processing a query to a database in a computer system, wherein the database comprises a table of data and an index correlated to both the query and to the table, the method comprising the following steps:

receiving the database query;

determining whether data responsive to the query has low distinct cardinality;

responsive to determining that the data responsive to the query has low distinct cardinality, accessing the index to determine if the table contains a first data entry satisfying a query predicate; and responsive to determining that the fist data entry satisfies the query and prior to determining that a second data entry satisfies the query, scanning substantially the entire table to retrieve substantially all data values satisfying the query.

9. The method as claimed in claim 8, further comprising the step of generating a query execution plan.

10. The method as claimed in claim 8, further comprising the step of returning a negative response if the table contains no instances of data satisfying the query predicate.

11. A program product stored on a computer readable medium having program logic recorded thereon for processing a query to a database system in a computer system, wherein the database system comprises a table of data and an index correlated to both the query and to the table, the program product comprising:

code for receiving a query and determine whether data responsive to the query has low distinct cardinality;

code for, responsive to determining that the data responsive to the query has low distinct cardinality, accessing the index to determine if the table contains a first data entry satisfying the query; and code for, responsive to determining that the first entry satisfies the query and prior to determining that a second data entry satisfies the query, scanning substantially the entire table to retrieve substantially all data values satisfying the query.

12. The program product as claimed in claim 11, further comprising code for generating a query execution plan that invokes the code for accessing the index to determine if the table contains an entry satisfying the query.

13. The program product as claimed in claim 11, wherein the query execution plan further invokes the code for scanning substantially the entire table and code for retrieving data satisfying the query if the table contains an entry satisfying the query.

14. A computer readable medium containing program instructions, which when executed by a processor in a computer system causes the processor to perform a method for processing a query to a database in the computer system, wherein the database comprises a table of data and an index correlated to both the query and to the table, the method comprising:

receiving the database query;

determining whether data responsive to the query has low distinct cardinality;

responsive to determining that the data responsive to the query has low distinct cardinality, accessing the index to determine if the table contains a first data entry satisfying a query predicate; and responsive to determining that the fist data entry satisfies the query and prior to determining that a second data entry satisfies the query, scanning substantially the entire table to retrieve substantially all data values satisfying the query.

15. The computer readable medium as claimed in claim 14, the method further comprising generating a query execution plan.

16. The computer readable medium as claimed in claim 14, the method further comprising returning a negative response if the table contains no instances of data satisfying the query predicate.

* * * * *